(12) United States Patent
Figgs et al.

(10) Patent No.: US 12,480,487 B1
(45) Date of Patent: Nov. 25, 2025

(54) FLUID END OF PUMP

(71) Applicant: SPM Oil & Gas Inc., Fort Worth, TX (US)

(72) Inventors: David Theodore Figgs, Fort Worth, TX (US); Michael C. Zanoff, Fort Worth, TX (US); Justin Poehls, Glen Rose, TX (US); Daryl Belshan, Weatherford, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 0 days.

(21) Appl. No.: 18/829,681

(22) Filed: Sep. 10, 2024

(51) Int. Cl.
 *F04B 53/16* (2006.01)
 *F04B 53/00* (2006.01)
 *F04B 53/22* (2006.01)
 *E21B 43/26* (2006.01)

(52) U.S. Cl.
 CPC .............. *F04B 53/00* (2013.01); *F04B 53/16* (2013.01); *F04B 53/22* (2013.01); *E21B 43/2607* (2020.05)

(58) Field of Classification Search
 CPC .................................. F04B 53/16; F04B 53/22
 See application file for complete search history.

(56) References Cited

U.S. PATENT DOCUMENTS

| | | | |
|---|---|---|---|
| 11,536,267 B2 | 12/2022 | Nowell et al. | |
| 11,852,135 B2 * | 12/2023 | Barnhouse, Jr. | F04B 53/16 |
| 11,920,583 B2 | 3/2024 | Foster et al. | |
| 12,049,889 B2 * | 7/2024 | Ellisor | F04B 53/166 |
| 2016/0108910 A1 * | 4/2016 | Smith | F04B 53/007 49/35 |
| 2017/0175799 A1 * | 6/2017 | Arnold | F04B 53/02 |
| 2019/0360483 A1 * | 11/2019 | Nowell | F04B 53/22 |
| 2020/0080660 A1 * | 3/2020 | Dyer | F01L 25/066 |
| 2021/0088167 A1 * | 3/2021 | Chunn | F16B 39/028 |
| 2021/0131458 A1 * | 5/2021 | Freed | F04B 53/16 |
| 2021/0131479 A1 * | 5/2021 | Freed | F16B 39/101 |
| 2021/0404464 A1 * | 12/2021 | Patoskie | F04B 53/16 |

FOREIGN PATENT DOCUMENTS

| | | |
|---|---|---|
| CA | 3208020 | 2/2024 |
| WO | 2020106603 | 5/2020 |

* cited by examiner

*Primary Examiner* — Thomas E Lazo

(57) ABSTRACT

A fluid end of a pump includes a fluid end body, a suction cap removably received within the bore of the fluid end body, and at least one retainer nut removably coupled with the fluid end body and disposed axially adjacent to the suction cap. The retainer nut includes a projection that extends outwards from the fluid end body. The fluid end includes at least one clamping assembly adapted to engage with a portion of the fluid end to prevent a rotation of the retainer nut relative to the fluid end body. The clamping assembly includes a clamp removably coupled with the retainer nut and a reaction arm removably coupled with the clamp and extending radially outwards from the annular portion of the clamp. The clamp includes an annular portion that circumferentially engages with the projection of the retainer nut.

20 Claims, 11 Drawing Sheets

FLUID END OF PUMP

TECHNICAL FIELD

The present disclosure relates to a fluid end of a pump and a method of preventing a rotation of a retainer nut of the fluid end of the pump.

BACKGROUND

A pump, such as a positive displacement pump, is used in hydraulic fracturing operations to pump high-pressure fracturing fluids into wells for recovery of oil and gas trapped in shale formations and the like. Typically, the pump has a power end which is coupled to a diesel engine and a transmission system that drives the pump. The pump also has a fluid end in which a mix of water, sand, and/or chemicals are pressurized by plungers.

The fluid end includes an access opening in communication with the bore. The access opening is closed off by a removable, retainer nut to provide selective access to an interior of the fluid end. The retainer nut has external threads that engage with internal threads on a fluid end body of the fluid end to couple the retainer nut with the fluid end body. The retainer nut may experience cyclic loading when the pump alternates between high pressure and low pressure. The internal threads of the fluid end body may be subjected to damage due to a backing out of the retainer nut as a result of the cyclic loading. Damage, or subsequent failure, of the internal threads may incur additional servicing costs to the fluid end and may increase downtime of the pump, which is not desirable.

U.S. Pat. No. 11,852,135 describes a retainer nut assembly for a fluid end of a pump system includes a plug with two blades separated by edge cuts, a plug exterior face and a threaded rod extending from the plug exterior face. Each of the blades includes an arcuate face. A mid-cap includes a hole for receiving the threaded rod therethrough with the mid-cap positioned adjacent the plug. The mid-cap further includes flange segments. A cover cap includes a hole for receiving the threaded rod therethrough with the cover cap positioned adjacent the mid-cap. The cover cap has extensions separated by cut outs. Each of the extensions are configured to extend axially between respective flange segments of the mid-cap when the cover cap is assembled to the mid-cap. A fastener engages the threaded rod and secures the retainer nut assembly together.

SUMMARY OF THE DISCLOSURE

In an aspect of the present disclosure, a fluid end of a pump, is provided. The fluid end includes a fluid end body defining a bore extending along an axis of the fluid end. The fluid end also includes a suction cap removably received within the bore of the fluid end body. The fluid end further includes at least one retainer nut removably coupled with the fluid end body and disposed axially adjacent to the suction cap. The at least one retainer nut is at least partially received within the bore of the fluid end body. The at least one retainer nut includes a projection that extends outwards from the fluid end body along the axis. The fluid end includes at least one clamping assembly that engages with a portion of the fluid end to prevent a rotation of the at least one retainer nut relative to the fluid end body. The at least one clamping assembly includes a clamp removably coupled with the at least one retainer nut. The clamp includes an annular portion that circumferentially engages with the projection of the at least one retainer nut. The at least one clamping assembly also includes a reaction arm extending radially outwards from the annular portion of the clamp.

In another aspect of the present disclosure, a fluid end of a pump is provided. The fluid end includes a fluid end body including a stepped portion. The fluid end body defines a bore extending along an axis of the fluid end. The stepped portion defines a shoulder. The fluid end includes a suction cap removably received within the bore of the fluid end body. The fluid end also includes a retainer nut removably coupled with the fluid end body and disposed axially adjacent to the suction cap. The retainer nut is at least partially received within the stepped portion of the fluid end body. The retainer nut includes a projection that extends outwards from the stepped portion of the fluid end body along the axis. The fluid end further includes a clamping assembly that engages with a portion of the fluid end to prevent a rotation of the retainer nut relative to the fluid end body. The clamping assembly includes a clamp removably coupled with the retainer nut. The clamp includes an annular portion that circumferentially engages with the projection of the retainer nut. The clamping assembly also includes a reaction arm integral to the annular portion of the clamp and extending radially outwards from the annular portion of the clamp. The clamping assembly further includes a pin coupled with the reaction arm of the clamp. The pin at least partially engages with the shoulder defined by the stepped portion to prevent the rotation of the retainer nut relative to the fluid end body.

In yet another aspect of the present disclosure, a method of preventing a rotation of at least one retainer nut of a fluid end of a pump is provided. The fluid end includes a fluid end body. The method includes removably coupling the at least one retainer nut with the fluid end body. The at least one retainer nut includes a projection that extends along an axis of the fluid end. The method also includes removably coupling a clamp of a clamping assembly with the at least one retainer nut. The clamp includes an annular portion that circumferentially engages with the projection of the at least one retainer nut. The clamping assembly further includes a reaction arm extending radially outwards from the annular portion of the clamp. The method further includes engaging the clamping assembly with a portion of the fluid end to prevent the rotation of the at least one retainer nut relative to the fluid end body.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
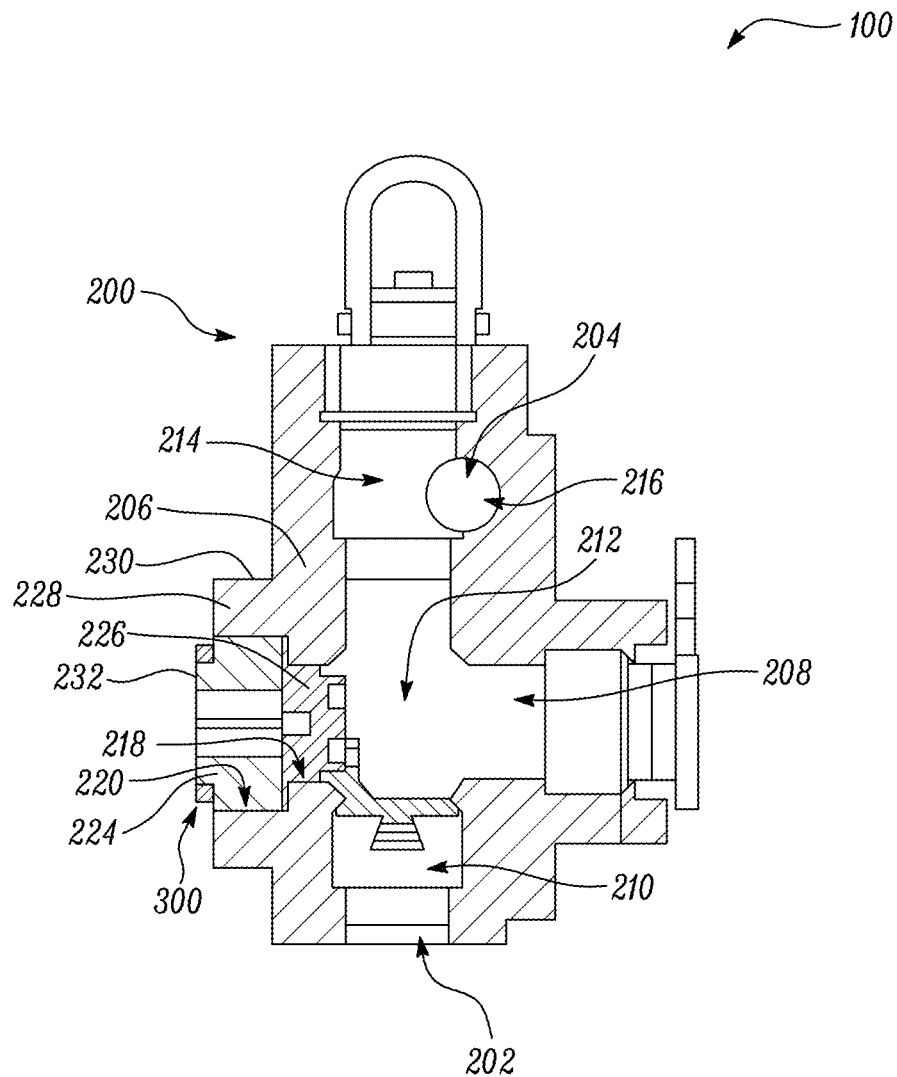
FIG. 1 is a cross-sectional view of a fluid end of a pump, according to an example of the present disclosure.

Referring to FIG. 1, a schematic sectional view of a fluid end 200 of a pump 100 is illustrated. The pump 100 may include any type of positive displacement pump. In an example, the pump 100 may include a reciprocating pump. Further, the pump 100 may be used in well stimulation arrangements as a hydraulic fracturing pump to pressurize high pressure fracturing (fracking) fluids into wells for recovery of oil and gas trapped in shale formations and the like. Alternatively, the pump 100 may be usable for other applications.

The pump 100 typically includes a power end (not shown), driven by a diesel engine and a transmission system. The power end is coupled to the fluid end 200. The fluid end 200 is supplied with the fracking fluid that may include water and other ingredients. The fluid end 200 receives the fracking fluid via an inlet 202. Further, the fracking fluid is pressurized in the fluid end 200 and discharged through an outlet 204.

The fluid end 200 includes a fluid end body 206. The fluid end body 206 defines a plunger bore 208, a suction bore 210, a center chamber 212 for pressurization of the fracking fluid, and a discharge bore 214. The discharge bore 214 feeds into a discharge passage 216 through which high pressure fracking fluid leaves the fluid end body 206.

The fluid end 200 also includes a plunger (not shown) received in the plunger bore 208. The plunger reciprocates to effect pressurization in the center chamber 212 to allow the fracking fluid therein, at low pressure from the suction bore 210. Correspondingly, the discharge bore 214 receives the pressurized fracking fluid from the center chamber 212 and discharges the same into the discharge passage 216.

Figure 2:
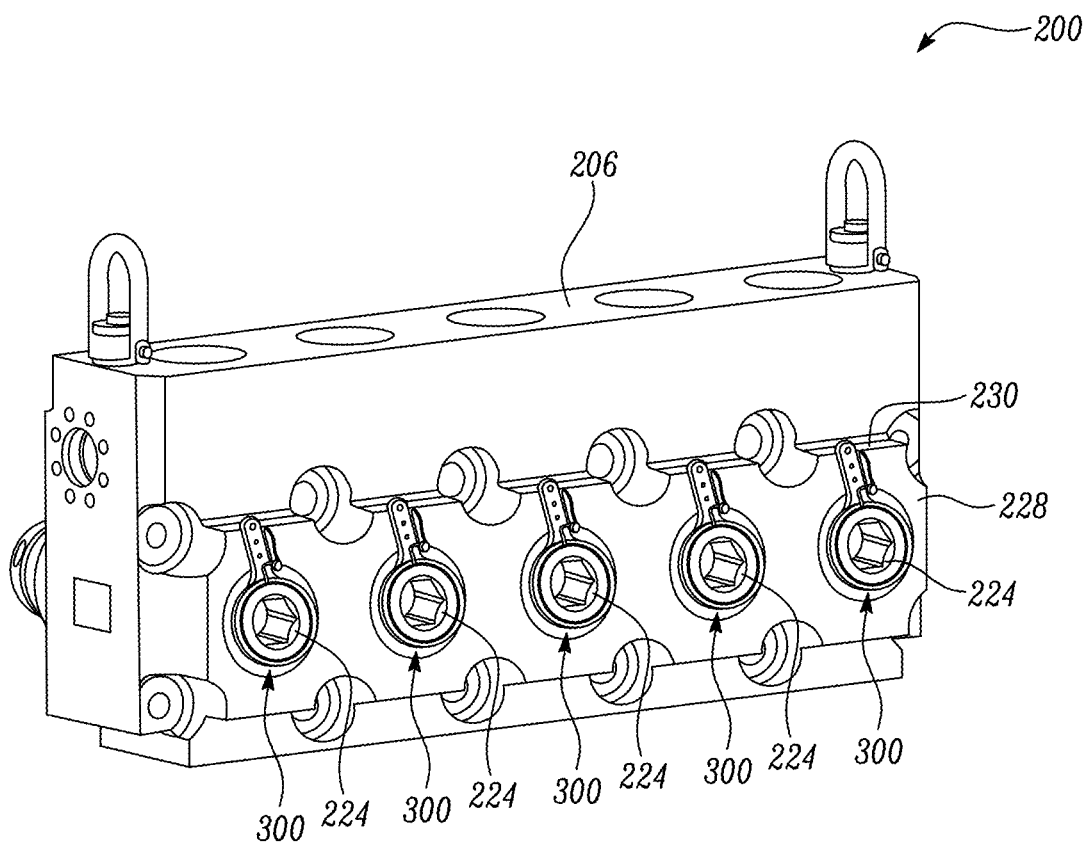
FIG. 2 is a perspective view of the fluid end of FIG. 2.

In the examples shown in FIGS. 1 and 2, the fluid end body 206 includes a stepped portion 228. The stepped portion 228 defines a shoulder 230. Alternatively, the fluid end body 206 may omit the stepped portion 228. Further, the fluid end body 206 also defines a bore 218 extending along an axis X1 of the fluid end 200. The fluid end 200 includes one or more retainer nuts 224. The one or more retainer nuts 224 will be interchangeably referred to as "the retainer nut 224" henceforth. The fluid end 200 includes a number of retainer nuts 224. Specifically, the fluid end 200 includes five retainer nuts 224. As shown, an access opening 220 of the fluid end 200 that is in communication with the bore 218 receives the removable, retainer nut 224 to provide selective access to the interior of the fluid end body 206. The fluid end body 206 defines a number of internal threads (not shown). Further, the retainer nut 224 defines a number of external threads (not shown) that engages with the internal threads of the fluid end body 206 to removably couple the retainer nut 224 with the fluid end body 206.

The fluid end 200 also includes a suction cap 226 received within the bore 218 of the fluid end body 206. The suction cap 226 is disposed to close off and isolate the center chamber 212 to prevent fluid flow-out through the bore 218 and the access opening 220. Further, the retainer nut 224 and the suction cap 226 may be removed to service components disposed in the fluid end 200.

The retainer nut 224 is removably coupled with the fluid end body 206 and disposed axially adjacent to the suction cap 226. As shown in FIGS. 1 and 2, the retainer nut 224 is at least partially received within the stepped portion 228 of the fluid end body 206. The retainer nut 224 includes a projection 232 that extends outwards from the stepped portion 228 of the fluid end body 206 along the axis X1. The fluid end 200 includes five retainer nuts 224.

Referring to FIG. 2, as the retainer nut 224 is subjected to cyclic loading, the retainer nut 224 tends to move/rotate in a direction D1, that is an anti-clockwise direction. The fluid end 200 further includes one or more clamping assemblies 300 that engages with a portion of the fluid end 200 to prevent a rotation of the retainer nut 224 relative to the fluid end body 206. The one or more clamping assemblies 300 will be interchangeably referred to as "the clamping assembly 300" henceforth. The clamping assembly 300 is secured to the retainer nut 224 using friction forces. The fluid end 200 includes five clamping assemblies 300, each of which is associated with a corresponding retainer nut 224.

Figure 3:
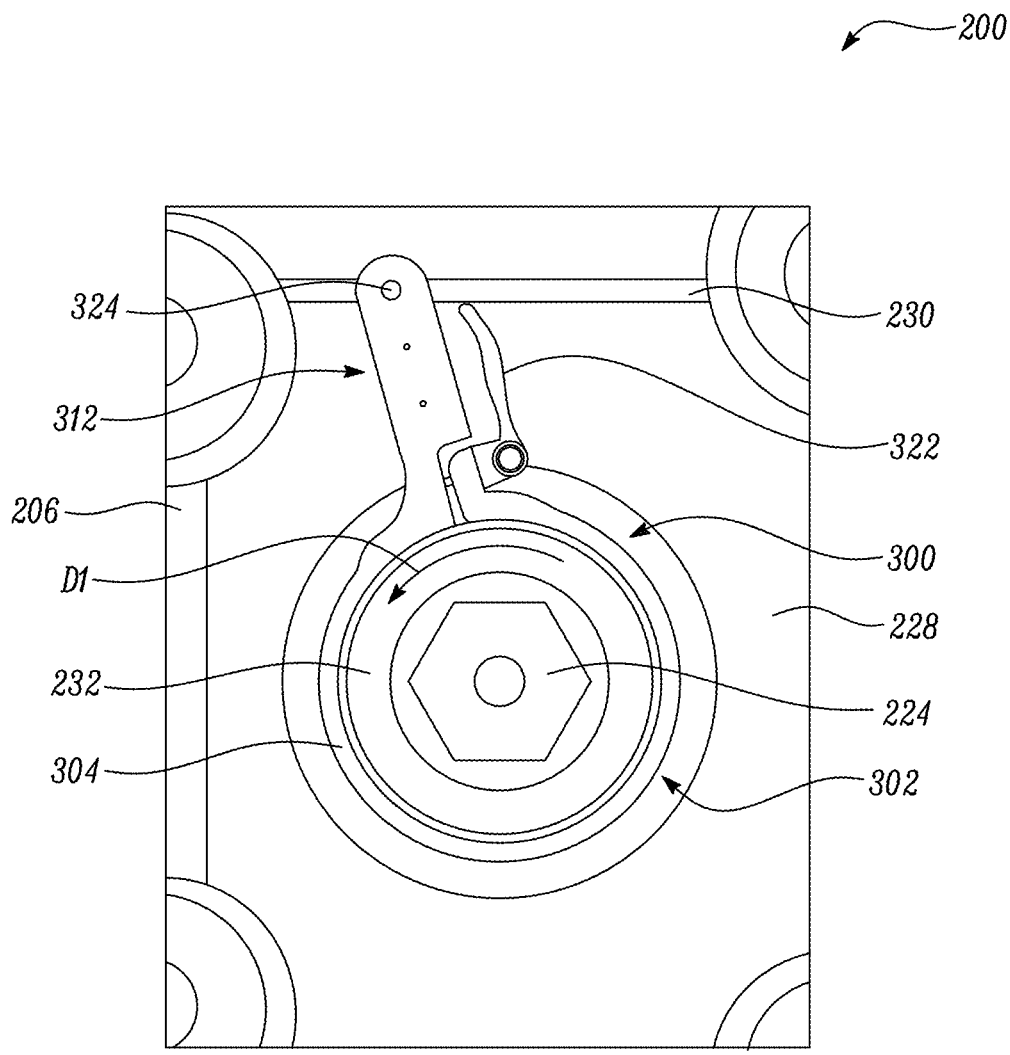
FIG. 3 illustrates a clamping assembly coupled with a fluid end body of the fluid end of FIG. 2, according to an example of the present disclosure.
Figure 4:
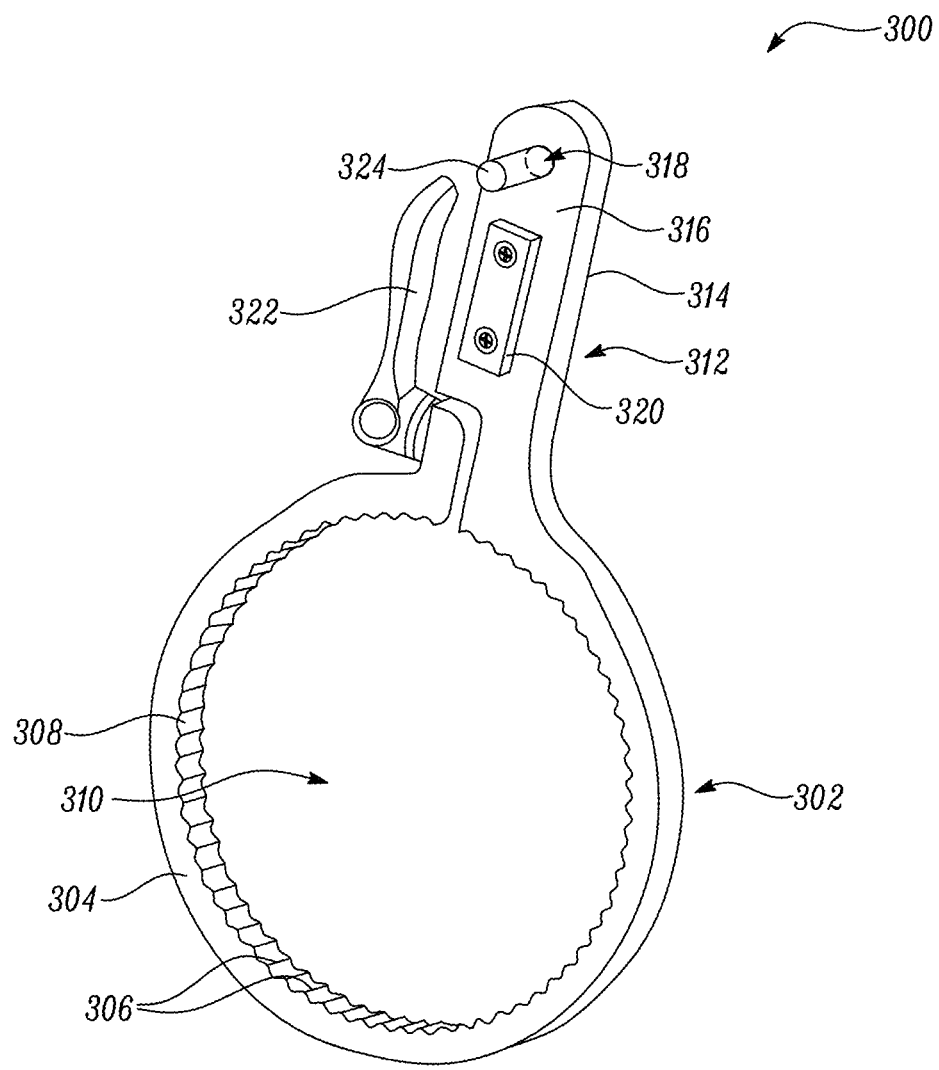
FIG. 4 is a perspective view of the clamping assembly of FIG. 3.

As shown in FIGS. 3 and 4, the clamping assembly 300 includes a clamp 302 removably coupled with the retainer nut 224. In an example, the clamp 302 is made of steel. The clamp 302 includes an annular portion 304 that circumferentially engages with the projection 232 of the retainer nut 224. As shown in FIG. 4, the annular portion 304 includes a number of teeth 306 extending from an inner surface 308 thereof. The number of teeth 306 face a central opening 310 of the annular portion 304 that receives the projection 232 (see FIG. 3) of the retainer nut 224 (see FIG. 3). When the clamp 302 is coupled with the retainer nut 224, the number of teeth 306 engage with the projection 232 of the retainer nut 224.

The clamping assembly 300 includes a reaction arm 312 extending radially outwards from the annular portion 304 of the clamp 302. In the illustrated example of FIG. 4, the reaction arm 312 is integral to the annular portion 304 of the clamp 302. The reaction arm 312 is embodied as an elongate bar member herein. The reaction arm 312 defines a front surface 314 and a rear surface 316. The reaction arm 312 defines a through-hole 318. In some examples, the reaction arm 312 may omit the through-hole 318.

The clamp 302 is a radial-style clamp. The clamp 302 further includes a cam lever 322 that is used to removably couple the annular portion 304 of the clamp 302 with the retainer nut 224. When the clamp 302 is to be removably coupled with the retainer nut 224, the cam lever 322 is disposed in an open position and the clamp 302 is placed around the projection 232. Further, once the clamping assembly 300 is disposed at the desired angular orientation, the cam lever 322 of the clamp 302 is moved to a closed position to removably couple the annular portion 304 of the clamp 302 with the retainer nut 224.

The clamping assembly 300 further includes a magnet 320 coupled with the reaction arm 312. The magnet 320 may be coupled to the reaction arm 312 using mechanical fasteners. The magnet 320 allows positioning of the clamping assembly 300 at a desired angular orientation relative to the fluid end body 206. Moreover, as shown in FIG. 5, the magnet 320 disposes the clamping assembly 300 at a desired distance from the fluid end body 206.

Figure 5:
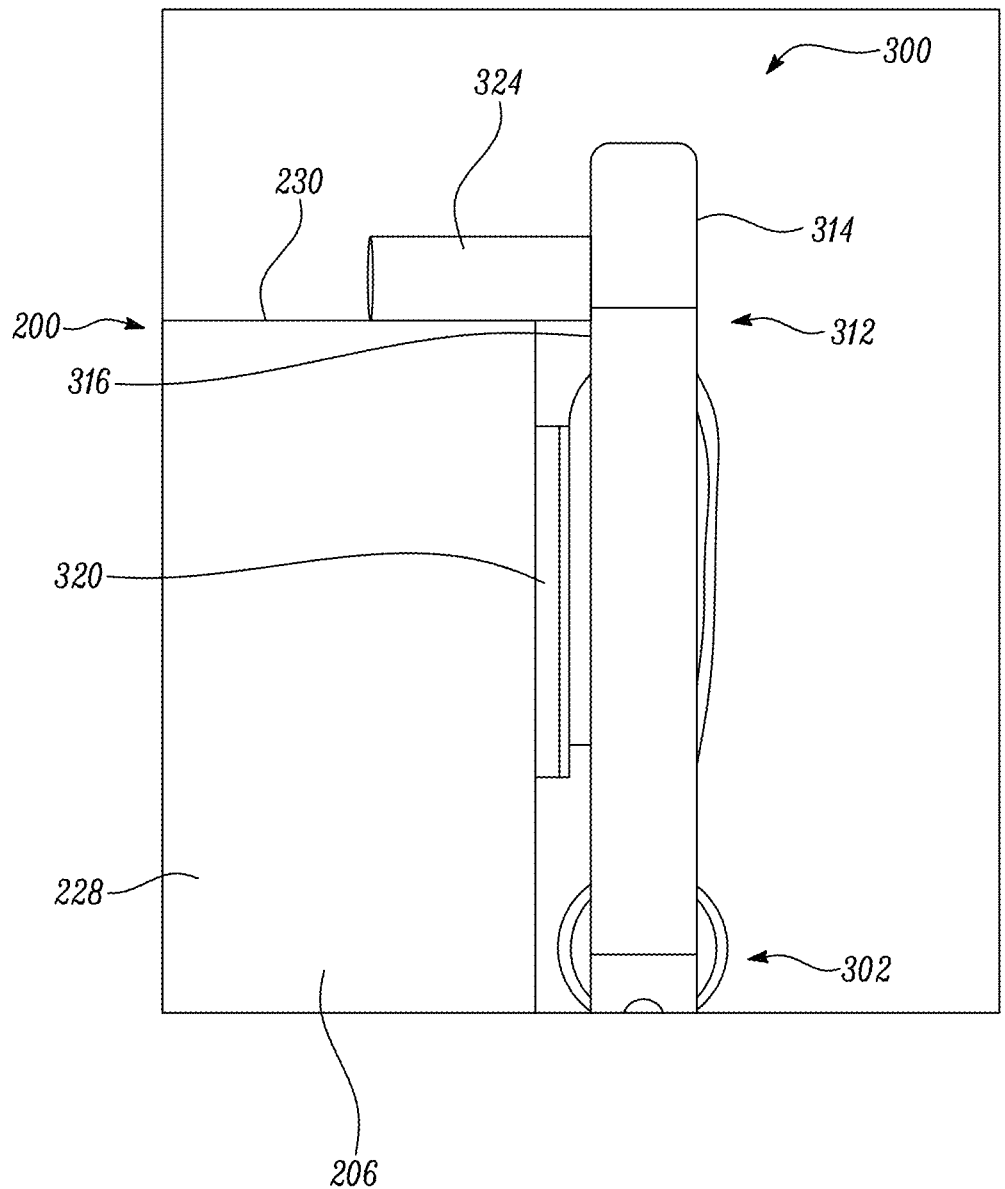
FIG. 5 is a side view illustrating the clamping assembly of FIG. 3 coupled with the fluid end body.

As shown in FIGS. 4 and 5, the clamping assembly 300 also includes a pin 324 coupled with the reaction arm 312 of the clamping assembly 300. Further, each of the pin 324 and the magnet 320 extends from the rear surface 316 of the reaction arm 312. The pin 324 is received within the through-hole 318 of the reaction arm 312. In another example, the pin 324 may be integral with the reaction arm 312 and may be machined from the rear surface 316. The pin 324 at least partially engages with the shoulder 230 defined by the stepped portion 228 to prevent the rotation of the retainer nut 224 relative to the fluid end body 206. In an example, at least half of an overall length of the pin 324 is in engagement with the shoulder 230, which prevents the rotation of the clamping assembly in the direction D1 (see FIG. 3). In an example, the pin 324 includes a dowel.

Figure 6:
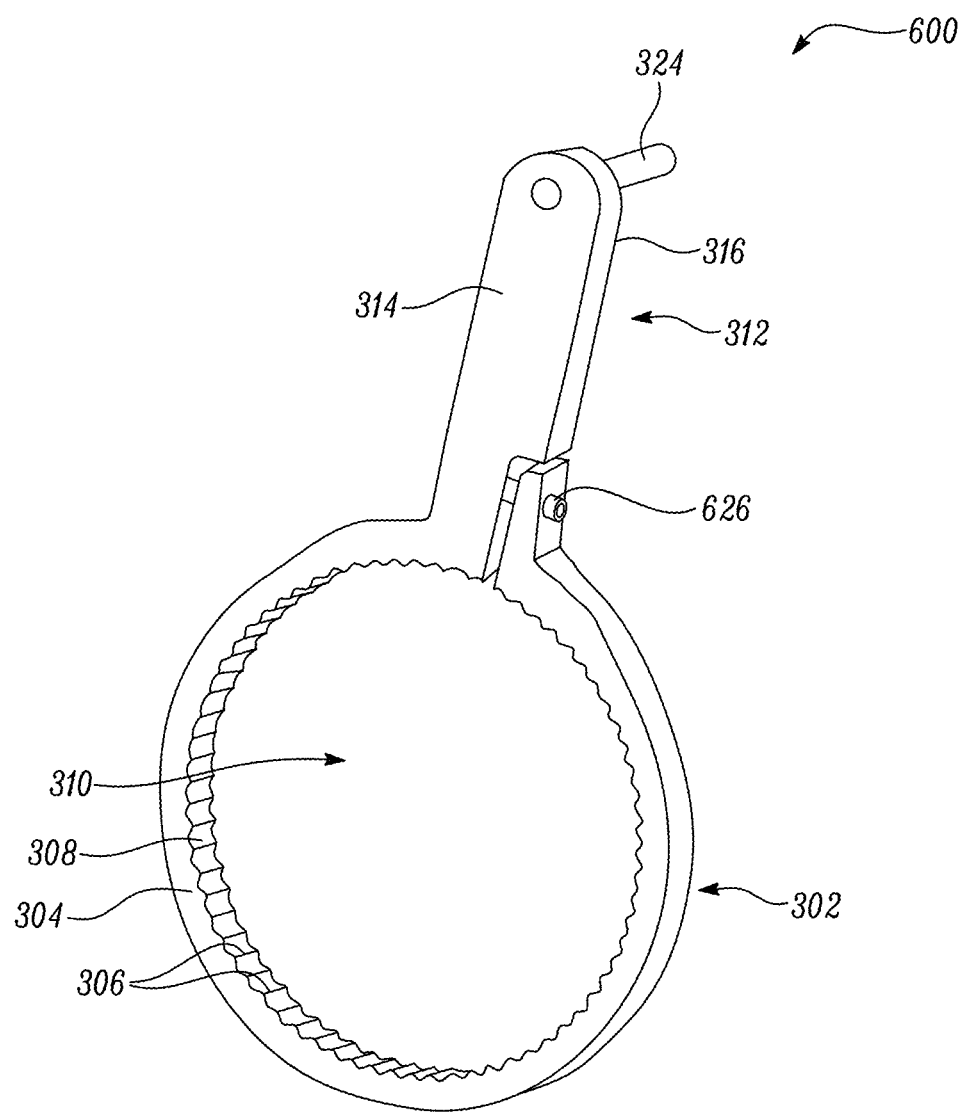
FIG. 6 is a perspective view of a clamping assembly that may be associated with the fluid end of FIG. 1, according to another example of the present disclosure.

Referring now to FIG. 6, a clamping assembly 600 that may be associated with the fluid end 200 of FIGS. 1 and 2 is illustrated. The clamping assembly 600 is substantially similar to the clamping assembly 300 described in relation to FIGS. 2 to 5 with common components being referred to by the same numerals. The clamping assembly 600 includes the clamp 302. The clamp 302 is a radial-style clamp. The clamping assembly 600 includes a mechanical fastener 626 that is used to removably couple the annular portion 304 of the clamp 302 with the retainer nut 224. When the clamping assembly 600 is to be removably coupled with the retainer nut 224, the mechanical fastener 626 is loosened or removed, and the clamp 302 is placed around the projection 232. Further, once the clamping assembly 600 is disposed at the desired angular orientation, the mechanical fastener 626 is tightened to removably couple the annular portion 304 of the clamp 302 with the retainer nut 224.

Figure 7:
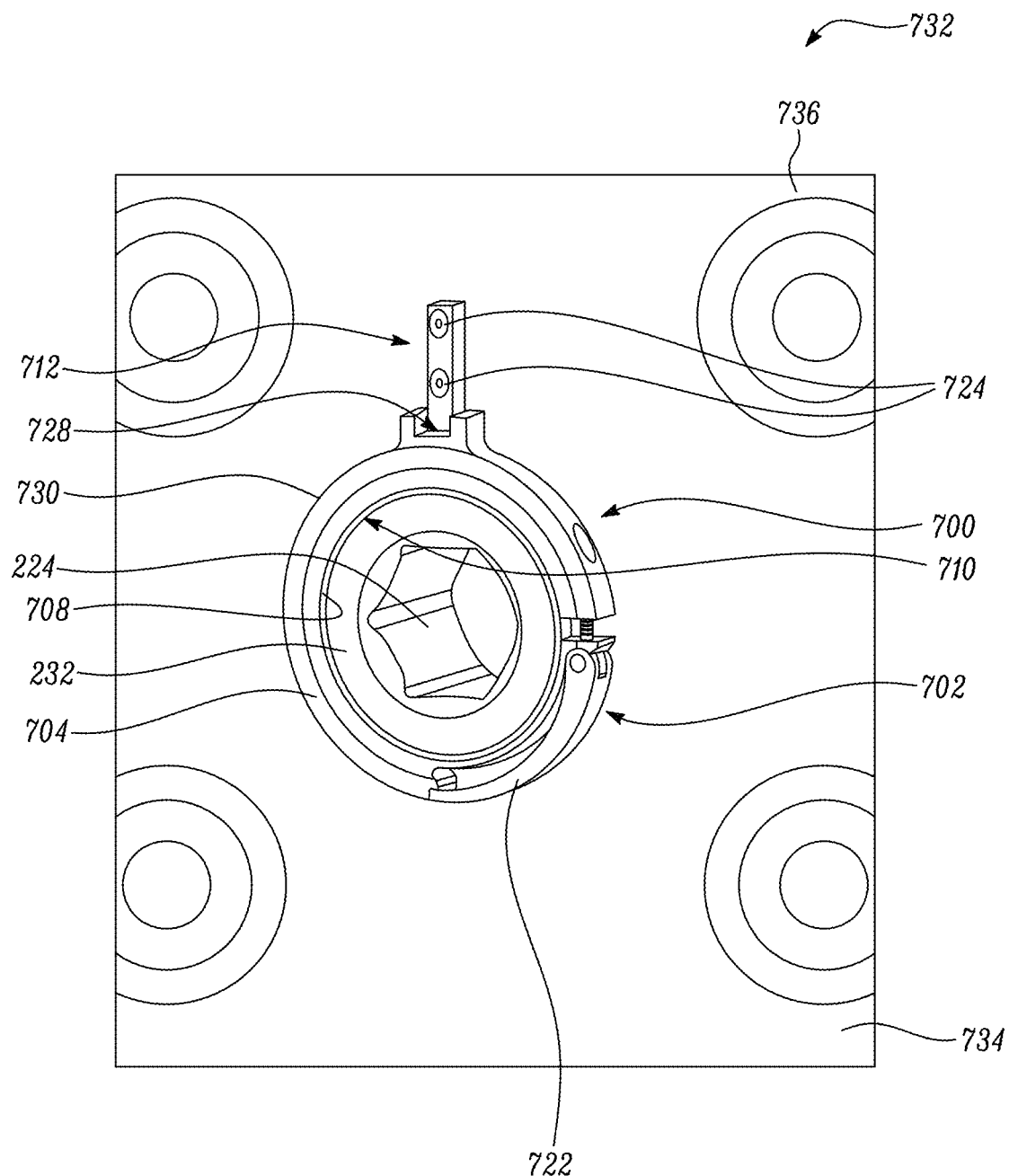
FIG. 7 is a perspective view of a clamping assembly that may be associated with the fluid end of FIG. 1, according to yet another example of the present disclosure.

Referring now to FIG. 7, a clamping assembly 700 associated with a fluid end 732 of FIGS. 1 and 2 is illustrated. The fluid end 732 is substantially similar to the fluid end 200 described in relation to FIGS. 2 to 6. The fluid end 732 includes a fluid end body 734. In the illustrated example of FIG. 7, the fluid end body 734 includes a flat face 736 instead of the stepped portion 228 (see FIG. 3). The clamping assembly 700 engages with the fluid end body 734 to prevent the rotation of the retainer nut 224 relative to the fluid end body 734. Specifically, the clamping assembly 700 engages with the flat face 736 of the fluid end body 734. The clamping assembly 700 is secured to the retainer nut 224 using friction forces. The clamping assembly 700 includes a clamp 702 removably coupled with the retainer nut 224. The clamp 702 includes an annular portion 704 that circumferentially engages with the projection 232 of the retainer nut 224. The annular portion 704 includes a number of teeth (not shown herein but similar to the teeth 306 shown in FIG. 4) extending from an inner surface 708 thereof. The number of teeth face a central opening 710 of the annular portion 704 that receives the projection 232 of the retainer nut 224. The number of teeth engage with the projection 232 of the retainer nut 224. Further, the annular portion 704 defines a pocket 728 at an outer surface 730 thereof.

The clamping assembly 700 further includes a cam lever 722 that is used to removably couple the annular portion 704 of the clamp 702 with the retainer nut 224. When the clamping assembly 700 is to be removably coupled with the retainer nut 224, the cam lever 722 is disposed in an open position and the clamp 702 is placed around the projection 232. Further, once the clamping assembly 700 is disposed at the desired angular orientation, the cam lever 722 of the clamp 702 is moved to a closed position to removably couple the annular portion 704 of the clamp 702 with the retainer nut 224.

Alternatively, the clamping assembly 700 may include a mechanical fastener that is used to removably couple the annular portion 704 of the clamp 702 with the retainer nut 224. The mechanical fastener may replace the cam lever 722. When the clamping assembly 700 is to be removably coupled with the retainer nut 224, the mechanical fastener is loosened or removed, and the clamp 702 is placed around the projection 232. Further, once the clamping assembly 700 is disposed at the desired angular orientation, the mechanical fastener is tightened to removably couple the annular portion 704 of the clamp 702 with the retainer nut 224.

The clamping assembly 700 further includes a reaction arm 712 removably coupled with the clamp 702 and extending radially outwards from the annular portion 704 of the clamp 702. The reaction arm 712 is at least partially received within the pocket 728 of the annular portion 704 to removably couple the reaction arm 712 with the clamp 702. The clamping assembly 700 further includes one or more fasteners 724. The one or more fasteners 724 couple the reaction arm 712 with the fluid end body 734 to prevent the rotation of the retainer nut 224 relative to the fluid end body 734. In the illustrated example of FIG. 7, the one or more fasteners 724 includes a pair of fasteners 724. However, the clamping assembly 700 may include a single fastener or more than two fasteners, without any limitations.

Figure 8:
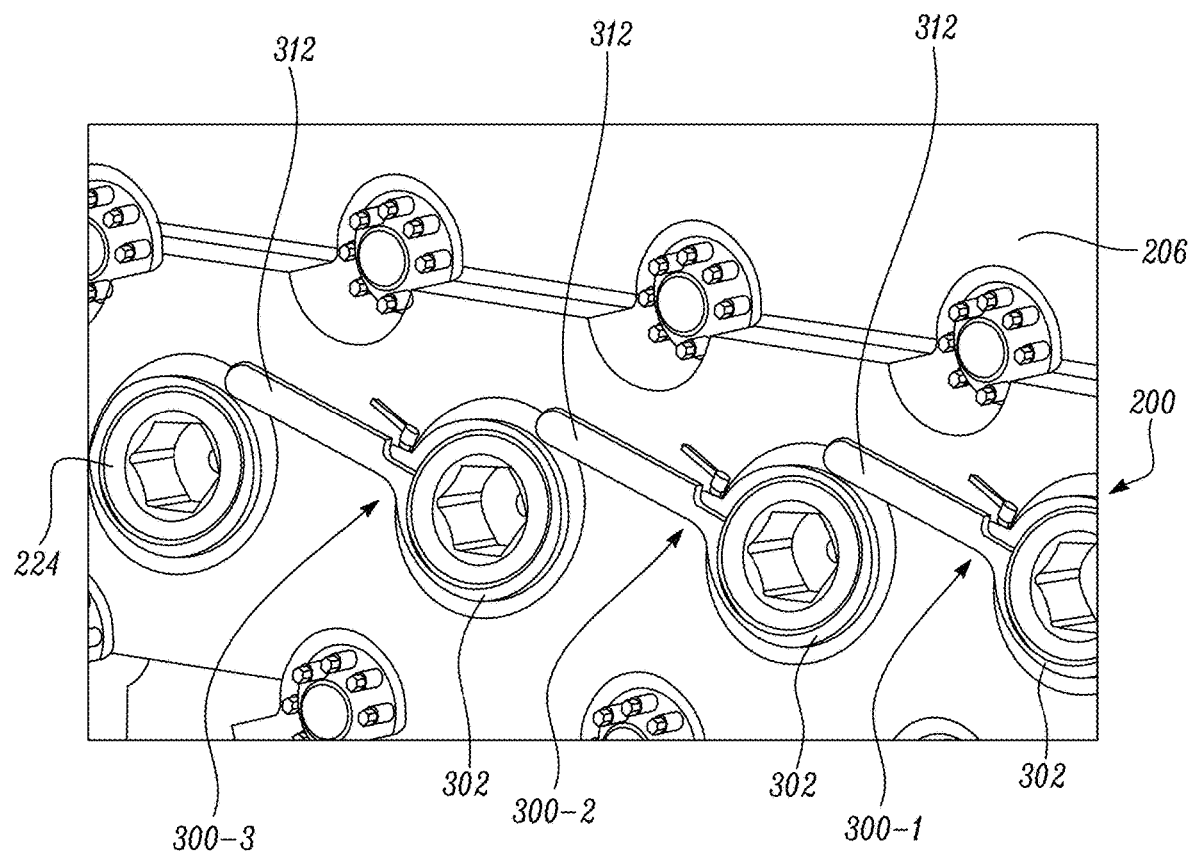
FIG. 8 is a perspective view of the clamping assembly of FIG. 3 reacting off a clamping assembly and a retainer nut, according to an example of the present disclosure.

Referring now to FIG. 8, three clamping assemblies 300-1, 300-2, 300-3 associated with the fluid end 200 are illustrated. The clamping assemblies 300-1, 300-2, 300-3 are similar to the clamping assembly 300 shown in FIG. 3, with common components being referred to by the same numerals. In some examples, the clamping assembly 300-1, 300-2, 300-3 engages with an adjacent clamping assembly 300-1, 300-2, 300-3 from the number of clamping assemblies 300 or an adjacent retainer nut 224 from the number of retainer nuts 224 to prevent the rotation of the retainer nut 224 relative to the fluid end body 206. Specifically, the reaction arm 312 of the clamping assemblies 300-1, 300-2 engages with the clamp 302 of the adjacent clamping assembly 300-2, 300-3 to prevent the rotation of the retainer nut 224 relative to the fluid end body 206. Further, the reaction arm 312 of the clamping assembly 300-3 engages with the adjacent retainer nut 224 to prevent the rotation of the retainer nut 224 relative to the fluid end body 206.

In this example, the clamping assembly 300 does not include the pin 324 (see FIG. 3) or the fasteners 724 (see FIG. 7). It should be noted that FIG. 8 illustrates an exemplary application, and the reaction arm 312 may react off only the retainer nuts 224 or the reaction arm 312 may react off only the clamps 302, without any limitations.

Figure 9:
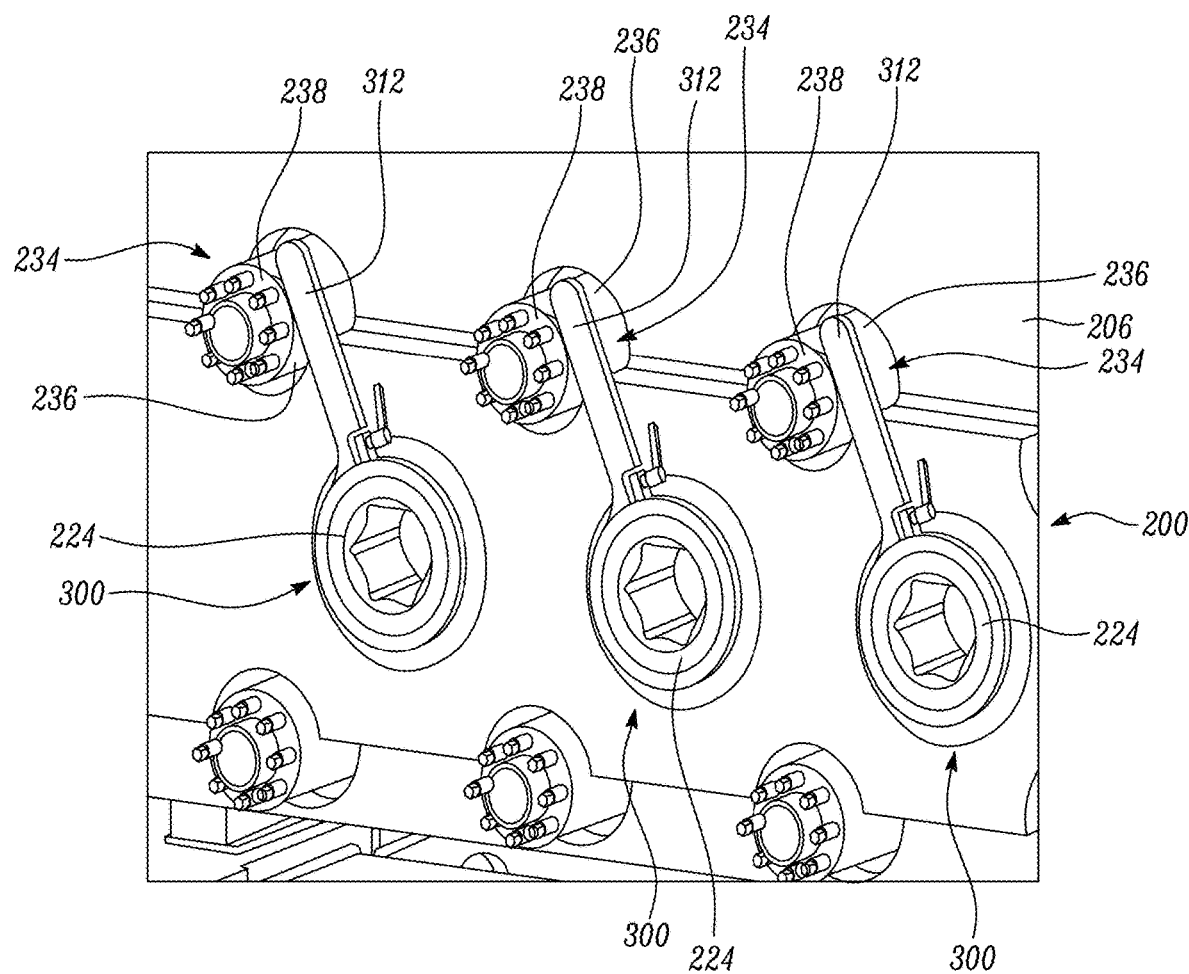
FIG. 9 is a perspective view of the clamping assembly of FIG. 3 reacting off a stay rod assembly of the fluid end of FIG. 3, according to another example of the present disclosure.

Referring now to FIG. 9, the clamping assembly 300 associated with the fluid end 200 is illustrated. The fluid end 200 further includes a number of stay rod assemblies 234 that connect the fluid end 200 with the power end of the pump 100 (see FIG. 1). The stay rod assembly 234 includes a stay rod 236 and a nut 238. In some examples, the clamping assembly 300 engages with an adjacent stay rod assembly 234 from the number of stay rod assemblies 234 to prevent the rotation of the retainer nut 224 relative to the fluid end body 206. Specifically, the reaction arm 312 of one clamping assembly 300 engages with the nut 238 of an adjacently disposed stay rod assembly 234 to prevent the rotation of the retainer nut 224 relative to the fluid end body 206. In this example, the clamping assembly 300 does not include the pin 324 (see FIG. 3) or the fasteners 724 (see FIG. 7).

Figure 10:
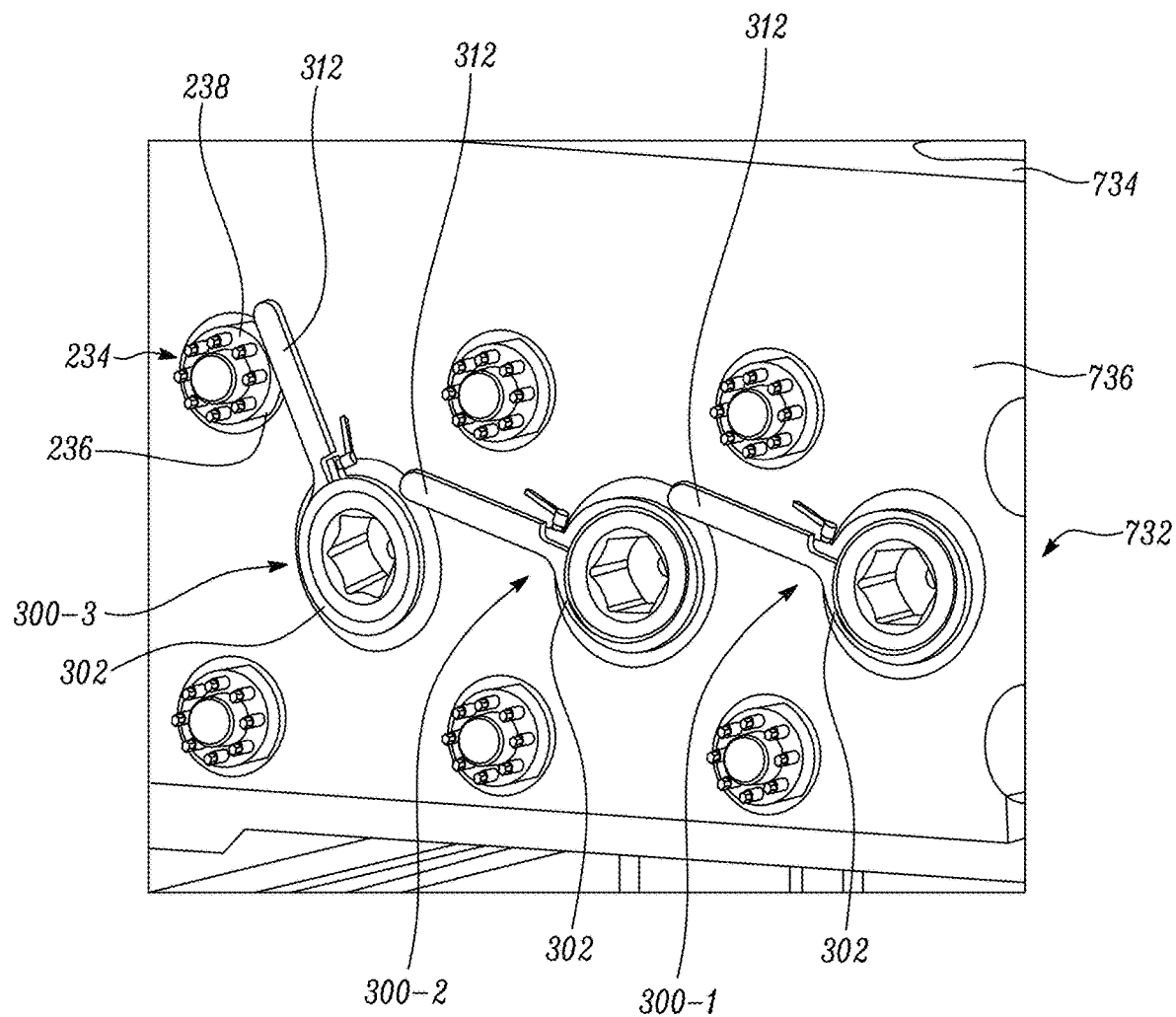
FIG. 10 is a perspective view of the clamping assembly of FIG. 3 reacting off a stay rod assembly or clamping assemblies of the fluid end of FIG. 7, according to yet another example of the present disclosure.
Figure 11:
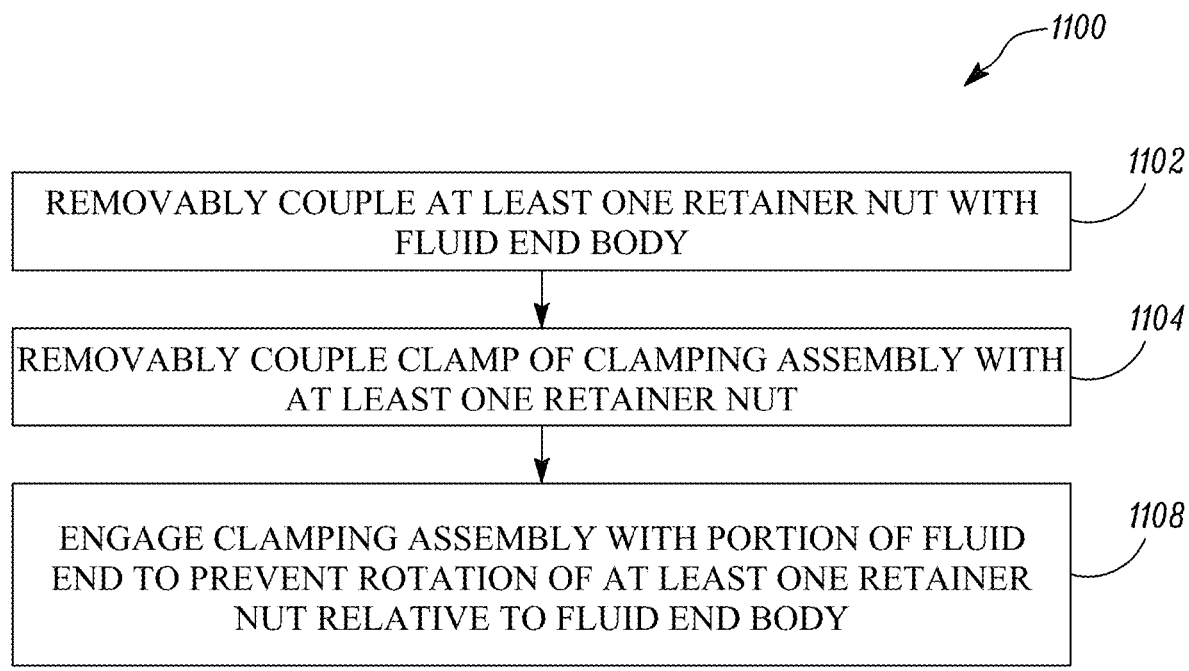
FIG. 11 is a flowchart for a method of preventing a rotation of a retainer nut of the fluid end of the pump, according to an example of the present disclosure.

Referring now to FIG. 10, three clamping assembly 300-1, 300-2, 300-3 associated with the fluid end 732 (also explained in relation to FIG. 7) are illustrated. The clamping assemblies 300-1, 300-2, 300-3 are similar to the clamping assembly 300 shown in FIG. 3, with common components being referred to by the same numerals. The fluid end body 734 includes the flat face 736, i.e., the fluid end body 734 does not include the stepped portion 228 (See FIG. 3) and the shoulder 230 (see FIG. 3).

In this example, the clamping assembly 300-1, 300-2, 300-3 may engage with an adjacent stay rod assembly 234 from the number of stay rod assemblies 234 or the clamping assembly 300-1, 300-2, 300-3 may engage with an adjacent clamping assembly 300-1, 300-2, 300-3 from the number of clamping assemblies 300-1, 300-2, 300-3 to prevent the rotation of the retainer nut 224 relative to the fluid end body 734. More particularly, the reaction arm 312 of the clamping assemblies 300-1, 300-2 engage with adjacent clamps 302 of the clamping assemblies 300-2, 300-3. Further, the clamping assembly 300-3 engages with the stay rod assembly 234.

In this example, the clamping assembly 300 does not include the pin 324 (see FIG. 3) or the fasteners 724 (see FIG. 7). It should be noted that FIG. 10 illustrates an exemplary application, and the reaction arm 312 may react off only the clamps 302 or the reaction arm 312 may react off only the stay rod assemblies 234, without any limitations.

It is to be understood that individual features shown or described for one embodiment may be combined with individual features shown or described for another embodiment. The above-described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the clamping assembly 300, 600, 700 for the fluid end 200. The clamping assembly 300, 600, 700 is secured to the fluid end body 206 to prevent the rotation of the retainer nut 224 in order to prevent internal threads of the fluid end body 206 from fatigue during cyclic loading. The clamping assembly 300, 600, 700 is secured to the retainer nut 224 using friction forces. Further, the reaction arm 312, 712 of the clamping assembly 300, 600, 700 engages with the fluid end body 206 to oppose the rotation of the retainer nut 224, thereby preventing the retainer nut 224 from backing out. In other words, the clamping assembly 300, 600, 700 locks the retainer nut 224 in place, thereby preventing the rotation of the retainer nut 224 in the direction D1.

The clamping assembly 300, 600, 700 described herein is simple in design, may be cost-effective, and may be retrofitted on existing fluid ends. The clamping assembly 300, 600, 700 prevents damage, and subsequent failure, of the internal threads of the fluid end body 206. The clamping assembly 300, 600, 700 may reduce a downtime of the fluid end 200 and may also reduce maintenance costs by reducing a susceptibility of damage of the fluid end body 206.

FIG. 8 is a flowchart for a method 1100 of preventing the rotation of the one or more retainer nuts 224 of the fluid end 200, 732 of the pump 100. Referring to FIGS. 3 to 11, the fluid end 200, 732 includes the fluid end body 206, 734.

At step 1102, the one or more retainer nuts 224 are fluidly coupled with the fluid end body 206, 734. The one or more retainer nuts 224 include the projection 232 that extends along the axis X1 of the fluid end 200.

At step 1104, the clamp 302 of the clamping assembly 300, 700 is removably coupled with the one or more retainer nuts 224. The clamp 302 includes the annular portion 304 that circumferentially engages with the projection 232 of the one or more retainer nuts 224. The clamping assembly 300, 700 further includes the reaction arm 312 extending radially outwards from the annular portion 304 of the clamp 302.

At step 1106, the clamping assembly 300, 700 engages with the portion of the fluid end 200, 732 to prevent the rotation of the one or more retainer nuts 224 relative to the fluid end body 206.

In an example, the step 1106 further includes coupling, via the one or more fasteners 724, the reaction arm 312 with the fluid end body 734 to prevent the rotation of the one or more retainer nuts 224 relative to the fluid end body 734.

In another example, the one or more retainer nuts 224 include the number of retainer nuts 224. The one or more clamping assemblies 300 include the number of clamping assemblies 300-1, 300-2, 300-3. The step 1106 further includes engaging the reaction arm 312 of the clamping assembly 300-1, 300-2, 300-3 with the adjacent clamping assembly 300-1, 300-2 from the number of clamping assemblies 300-1, 300-2, 300-3 or the adjacent retainer nut 224 from the number of retainer nuts 224 to prevent the rotation of the one or more retainer nuts 224 relative to the fluid end body 206.

In yet another example, the fluid end 200 includes the number of stay rod assemblies 234. The one or more clamping assemblies 300 include the number of clamping assemblies 300. The step 1106 further includes engaging the reaction arm 312 of the clamping assembly 300 with the adjacent stay rod assembly 234 from the number of stay rod assemblies 234 to prevent the rotation of the one or more retainer nuts 224 relative to the fluid end body 206.

In an example, the fluid end body 206 includes the stepped portion 228. The stepped portion 228 defines the shoulder 230. The clamping assembly 300 further includes the pin 324 coupled with the reaction arm 312 of the clamping assembly 300. The step 1106 further includes at least partially engaging the pin 324 with the shoulder 230 defined by the stepped portion 228 to prevent the rotation of the one or more retainer nuts 224 relative to the fluid end body 206.

It should be noted that the steps 1102, 1104, 1106 of the method 1100 may be performed in a sequence that is different from that explained in relation to FIG. 8. Further, various steps 1102, 1104, 1106 can be performed together.

While aspects of the present disclosure have been particularly shown and described with reference to the embodiments above, it will be understood by those skilled in the art that various additional embodiments may be contemplated by the modification of the disclosed work machines, systems and methods without departing from the spirit and scope of the disclosure. Such embodiments should be understood to fall within the scope of the present disclosure as determined based upon the claims and any equivalents thereof.

What is claimed is:
1. A fluid end of a pump, comprising:
   a fluid end body defining a bore extending along an axis of the fluid end;

a suction cap removably received within the bore of the fluid end body;

at least one retainer nut removably coupled with the fluid end body and disposed axially adjacent to the suction cap, wherein the at least one retainer nut is at least partially received within the bore of the fluid end body, and wherein the at least one retainer nut includes a projection that extends outwards from the fluid end body along the axis; and at least one clamping assembly that engages with a portion of the fluid end to prevent a rotation of the at least one retainer nut relative to the fluid end body, wherein the at least one clamping assembly includes:
 a clamp removably coupled with the at least one retainer nut, and wherein the clamp includes an annular portion that circumferentially engages with the projection of the at least one retainer nut; and
 a reaction arm extending radially outwards from the annular portion of the clamp.

2. The fluid end of claim 1, wherein the reaction arm is integral to the annular portion of the clamp.

3. The fluid end of claim 2, wherein the at least one retainer nut includes a plurality of retainer nuts, wherein the at least one clamping assembly includes a plurality of clamping assemblies, and wherein the reaction arm is adapted to engage with an adjacent clamping assembly from the plurality of clamping assemblies or an adjacent retainer nut from the plurality of retainer nuts to prevent the rotation of the at least one retainer nut relative to the fluid end body.

4. The fluid end of claim 2 further comprising a plurality of stay rod assemblies, wherein the at least one clamping assembly includes a plurality of clamping assemblies, and wherein the reaction arm is adapted to engage with an adjacent stay rod assembly from the plurality of stay rod assemblies to prevent the rotation of the at least one retainer nut relative to the fluid end body.

5. The fluid end of claim 2, wherein the fluid end body includes a stepped portion, wherein the stepped portion defines a shoulder, wherein the clamping assembly further includes a pin coupled with the reaction arm of the clamp, and wherein the pin at least partially engages with the shoulder defined by the stepped portion to prevent the rotation of the at least one retainer nut relative to the fluid end body.

6. The fluid end of claim 5, wherein the clamping assembly further includes a magnet coupled with the reaction arm, wherein the magnet allows positioning of the clamping assembly at a desired angular orientation relative to the fluid end body, and wherein the magnet disposes the clamping assembly at a desired distance from the fluid end body.

7. The fluid end of claim 1, wherein the reaction arm is removably coupled to the clamping assembly, and wherein the clamping assembly further includes at least one fastener that couples the reaction arm with the fluid end body to prevent the rotation of the at least one retainer nut relative to the fluid end body.

8. The fluid end of claim 1, wherein the clamp is a radial-style clamp, and wherein the clamp further includes a cam lever that is used to removably couple the annular portion of the clamp with the at least one retainer nut.

9. The fluid end of claim 1, wherein the clamp is a radial-style clamp, and wherein the clamp further includes a mechanical fastener that is used to removably couple the annular portion of the clamp with the at least one retainer nut.

10. The fluid end of claim 1, wherein the annular portion includes a plurality of teeth extending from an inner surface thereof, wherein the plurality of teeth face a central opening of the annular portion that receives the projection of the at least one retainer nut, and wherein the plurality of teeth engage with the projection of the at least one retainer nut.

11. A fluid end of a pump, comprising:
 a fluid end body including a stepped portion, the fluid end body defining a bore extending along an axis of the fluid end, wherein the stepped portion defines a shoulder;
 a suction cap removably received within the bore of the fluid end body;
 a retainer nut removably coupled with the fluid end body and disposed axially adjacent to the suction cap, wherein the retainer nut is at least partially received within the stepped portion of the fluid end body, and wherein the retainer nut includes a projection that extends outwards from the stepped portion of the fluid end body along the axis; and
 a clamping assembly that engages with a portion of the fluid end to prevent a rotation of the retainer nut relative to the fluid end body, wherein the clamping assembly includes:
  a clamp removably coupled with the retainer nut, wherein the clamp includes an annular portion that circumferentially engages with the projection of the retainer nut; and
  a reaction arm integral to the annular portion of the clamp and extending radially outwards from the annular portion of the clamp; and
  a pin coupled with the reaction arm of the clamp, wherein the pin at least partially engages with the shoulder defined by the stepped portion to prevent the rotation of the retainer nut relative to the fluid end body.

12. The fluid end of claim 11, wherein the clamp is a radial-style clamp, and wherein the clamp further includes a cam lever that is used to removably couple the annular portion of the clamp with the retainer nut.

13. The fluid end of claim 11, wherein the clamp is a radial-style clamp, and wherein the clamp further includes a mechanical fastener that is used to removably couple the annular portion of the clamp with the retainer nut.

14. The fluid end of claim 11, wherein the clamping assembly further includes a magnet coupled with the reaction arm, wherein the magnet allows positioning of the clamping assembly at a desired angular orientation relative to the fluid end body, and wherein the magnet disposes the clamping assembly at a desired distance from the fluid end body.

15. The fluid end of claim 11, wherein the annular portion includes a plurality of teeth extending from an inner surface thereof, wherein the plurality of teeth face a central opening of the annular portion that receives the projection of the retainer nut, and wherein the plurality of teeth engage with the projection of the retainer nut.

16. A method of preventing a rotation of at least one retainer nut of a fluid end of a pump, the fluid end including a fluid end body, the method comprising:
 removably coupling the at least one retainer nut with the fluid end body, wherein the at least one retainer nut includes a projection that extends along an axis of the fluid end;
 removably coupling a clamp of a clamping assembly with the at least one retainer nut, wherein the clamp includes an annular portion that circumferentially engages with the projection of the at least one retainer nut, and wherein the clamping assembly further includes a reaction arm extending radially outwards from the annular portion of the clamp; and engaging the clamping assembly with a portion of the fluid end to prevent the rotation of the at least one retainer nut relative to the fluid end body.

17. The method of claim 16, wherein the step of engaging the clamping assembly with the portion of the fluid end further includes coupling, via at least one fastener, the reaction arm with the fluid end body to prevent the rotation of the at least one retainer nut relative to the fluid end body.

18. The method of claim 16, wherein the at least one retainer nut includes a plurality of retainer nuts, wherein the at least one clamping assembly includes a plurality of clamping assemblies, and wherein the step of engaging the clamping assembly with the portion of the fluid end further includes engaging the reaction arm of the clamping assembly with an adjacent clamping assembly from the plurality of clamping assemblies or an adjacent retainer nut from the plurality of retainer nuts to prevent the rotation of the at least one retainer nut relative to the fluid end body.

19. The method of claim 16, wherein the fluid end includes a plurality of stay rod assemblies, wherein the at least one clamping assembly includes a plurality of clamping assemblies, and wherein the step of engaging the clamping assembly with the portion of the fluid end engaging the reaction arm of the clamping assembly with an adjacent stay rod assembly from the plurality of stay rod assemblies to prevent the rotation of the at least one retainer nut relative to the fluid end body.

20. The method of claim 16, wherein the fluid end body includes a stepped portion, wherein the stepped portion defines a shoulder, wherein the clamping assembly further includes a pin coupled with the reaction arm of the clamping assembly, and wherein the step of engaging the clamping assembly with the portion of the fluid end further includes at least partially engaging the pin with the shoulder defined by the stepped portion to prevent the rotation of the at least one retainer nut relative to the fluid end body.

* * * * *